(12) United States Patent
Miller

(10) Patent No.: US 7,177,328 B2
(45) Date of Patent: Feb. 13, 2007

(54) CROSS-CONNECT SWITCH FOR SYNCHRONOUS NETWORK

(75) Inventor: Glen W. Miller, Bradford, MA (US)

(73) Assignee: Transwitch Corporation, Shelton, CT (US)

( * ) Notice: Subject to any disclaimer, the term of this patent is extended or adjusted under 35 U.S.C. 154(b) by 437 days.

(21) Appl. No.: 10/306,232

(22) Filed: Nov. 27, 2002

(65) Prior Publication Data

US 2004/0100994 A1 May 27, 2004

(51) Int. Cl.
*H04J 3/06* (2006.01)
(52) U.S. Cl. .................. 370/503; 370/538; 370/540
(58) Field of Classification Search ............. 370/370, 370/380, 503, 538, 540
See application file for complete search history.

(56) References Cited

U.S. PATENT DOCUMENTS

| | | | |
|---|---|---|---|
| 4,967,405 A * | 10/1990 | Upp et al. ................. 398/50 |
| 4,998,242 A | 3/1991 | Upp | |
| 5,144,297 A | 9/1992 | Ohara | |
| 5,189,410 A | 2/1993 | Kosugi et al. | |
| 5,323,390 A | 6/1994 | Pawelski | |
| 5,914,952 A | 6/1999 | Eom et al. | |
| 6,317,439 B1 | 11/2001 | Cardona et al. | |
| 6,502,197 B1 * | 12/2002 | Raza ......................... 713/400 |
| 6,631,130 B1 * | 10/2003 | Roy et al. .................. 370/352 |
| 2002/0001305 A1 * | 1/2002 | Hughes et al. ............. 370/369 |

OTHER PUBLICATIONS

An article entitled "Killington: TimeStream™ Product Family, Quad STS-48/STM-16 and STS-192/STM-64 Line Interface" from VITESSE Product Overview VSC9186, MPO.1 Mar. 1, 2002.
VITESSE Semiconductor Corporation Data Sheet VSC9182, Dec. 6, 2001.

* cited by examiner

*Primary Examiner*—Huy D. Vu
*Assistant Examiner*—Jason Mattis
(74) *Attorney, Agent, or Firm*—Larson Newman Abel Polansky & White, LLP

(57) ABSTRACT

A cross-connect switch (1000) is adapted for a plurality of input channels in a synchronous network. Each input channel has a pointer processor (800) including a pointer interpreter (802), an elastic store buffer (804), and a pointer generator (806). The cross-connect switch (1000) further comprises a memory-less space switch (1020) interposed between a plurality of pointer interpreters (1010) and a plurality of elastic store buffers (1030). The space switch (1020) switches selected outputs of the plurality of pointer interpreters (1010) to inputs of each elastic store buffer (1000) in response to a switching control signal.

18 Claims, 12 Drawing Sheets

CROSS-CONNECT SWITCH FOR SYNCHRONOUS NETWORK

FIELD OF THE INVENTION

This invention relates generally to telecommunications switches, and more particularly to a cross-connect switch for a synchronous network such as a synchronous optical network (SONET) or a synchronous digital hierarchy (SDH).

BACKGROUND OF THE INVENTION

Digital telecommunication between various localized networks is costly because of differences in digital signal hierarchies, encoding techniques and multiplexing strategies. For example there are many different signals in the well-known Digital Multiplex Hierarchy (DMH). At the bottom of the DMH hierarchy is a basic voice channel signal having a rate of 64 kilobits per second (kbps) and known as "DS-0". A "DS-1" signal, used in leased lines commonly referred to as "T1" lines, consists of 24 DS-0 signals and one framing bit per frame and has an overall rate of 1.544 megabits per second (Mbps). An "E1" signal consists of 30 DS-0 signals and 2 channels for framing and signaling, providing an overall rate of 2.048 Mbps. A T3 signal consists of 28 DS1 signals plus framing information, providing an overall rate of 44.736 Mbps. Communication between such diverse networks requires complicated multiplexing/demultiplexing and coding/decoding processes to convert a signal from one format to another format and to cross-connect signals between lines.

The SONET (Synchronous Optical Network) protocol was developed to standardize rates and formats. SONET is specified in American National Standards Institute (ANSI) Recommendation T1.105. SONET allows data streams of different formats, such as T1, T3, and E1, to be combined onto a single high-speed fiber optic synchronous data stream. G.707 is a standard from the International Telecommunications Union (ITU) that implements a synchronous network protocol similar to SONET, referred to as a synchronous digital hierarchy (SDH). As used herein, the term synchronous network encompasses SONET, SDH, and any similar hierarchical network.

In the example of SONET, a synchronous transport signal (STS) is the basic building block of SONET optical interfaces. The STS consists of two parts, the STS payload (carrying data) and the STS overhead (carrying signaling and protocol information). A signal is converted to STS and travels through various SONET networks in the STS format until it reaches line terminating equipment, which converts it back to the user's format.

An STS level one (STS-1) is the basic signal rate of SONET, with a rate of 51.84 Mbps. STS-1 uses a frame length of 125 μsec or conversely a frame rate of 8000 frames per second using a corresponding optical carrier level-1 (OC-1) optical signal. Higher data rates are transported using SONET by multiplexing N lower level signals together. To this end, SONET defines optical and electrical signals designated as OC-N (optical carrier level-N) and STS-N (synchronous transport signal level-N), where OC-N and STS-N have the same data rate for a given value of N. Accordingly, just as STS-1 and OC-1 share a common data rate of 51.84 Mb/s, OC-3/STS-3 both have a data rate of 155.52 Mb/s. The STS-3 frame combines three STS-1 frames in a time-division-multiplex fashion wherein the first time slot contains the first byte of the first STS-1 frame, the second time slot contains the first byte of the second STS-1 frame, the fourth time slot contains the second byte of the first STS-1 frame, and so on. An STS-48 frame is associated with an OC-48 signal at 2.5 Gigabits per second (Gbps) and includes data interleaved from forty-eight STS-1 frames as described above.

Various DMH signals may be included in the synchronous payload envelope (SPE), and the SONET standard is sufficiently flexible to allow new data rates to be supported, as services require them. In a common implementation, DS-1 signals are mapped into virtual tributaries (VTs), which are in turn multiplexed into an STS-1 SPE, and are then multiplexed further into an OC-N signal such as OC-48. The payload of a particular SPE may be associated with one of four different sizes of virtual tributaries (VTs). The VTs are VT1.5 having a data rate of 1.728 Mb/s, VT2 at 2.304 Mb/s, VT3 at 3.456 Mb/s, and, VT6 at 6.912 Mb/s. A superframe consists of four STS-1 frames, and is used to transmit a VT. The alignment of a VT within the bytes of the payload allocated for that VT is indicated by a pointer contained within two VT pointer bytes, which contain a pointer offset similar to the STS-1 pointer described below.

When cross-connect switching either STS-level or VT-level signals within SONET based communications systems, known cross-connect switches use a technique known as time-space-time switching. These cross-connect switches receive multiple system inputs that are not frame aligned, and are possibly asynchronous to each other. The cross-connect switches synchronize the inputs and column-align them in time by a technique known as pointer processing (the first time component). The pointer processed inputs are then brought together by storing this column aligned data in a large central memory (the space component). Finally, the system output selects the correct data column from the memory to create the output framed data signal (the final time component).

An important feature of these switching systems is their ability to be made non-blocking. A non-blocking system is capable of switching any input VT signal to any output VT time slot. To be considered non-blocking there must not be any combination of input VT signal to output VT time slot that cannot be connected. To create non-blocking switching systems using conventional time-space-time switching there must be a dedicated memory read port for each output because every VT output may request the same VT input simultaneously. However there are physical limitations to the number of read ports available on time slot interchange (TSI) memory devices. This physical limitation forces system architectures to implement structures such as systolic memory arrays (described below in FIG. 5) as the number of system inputs increases. However the number of column storage memory devices required to implement these systolic arrays increases exponentially as the number of inputs and/or outputs increases. Thus some elements of this type of system, including the input framers, pointer processors and output frame formatters, grow linearly as the number of inputs increases. However the column storage memory grows exponentially with the number of inputs making systems with large numbers of inputs prohibitive. It would be desirable, then, to eliminate this exponential growth relationship in known SONET cross-connect switches as the number of inputs increases. Such a cross-connect switch and related methods are provided by the present invention, whose features and advantages will be more clearly understood from the following detailed description taken in conjunction with accompanying drawings.

BRIEF DESCRIPTION OF THE DRAWINGS

The present invention will hereinafter be described in conjunction with the following drawing figures, wherein like reference numbers denote like elements, and wherein.

DETAILED DESCRIPTION OF THE PREFERRED EMBODIMENTS

According to the present invention a cross-connect switch avoids the need for a large time slot interchange memory, whose size grows exponentially with the number of inputs, to perform space switching. Instead the cross-connect switch uses a simple combinatorial space switch whose size grows linearly with the number of inputs. The cross-connect switch changes the cross-connect point by splitting up the pointer processing function—the first time switch—into its constituent parts. Then it performs a combinatorial multiplexing prior to storing channel data in an elastic store buffer at a point in the system before the data has been reclocked at the output clock rate. The cross-connect switch is useful at either the STS-n level or the VT level with a simple change in the pointer interpretation function.

Figure 1:
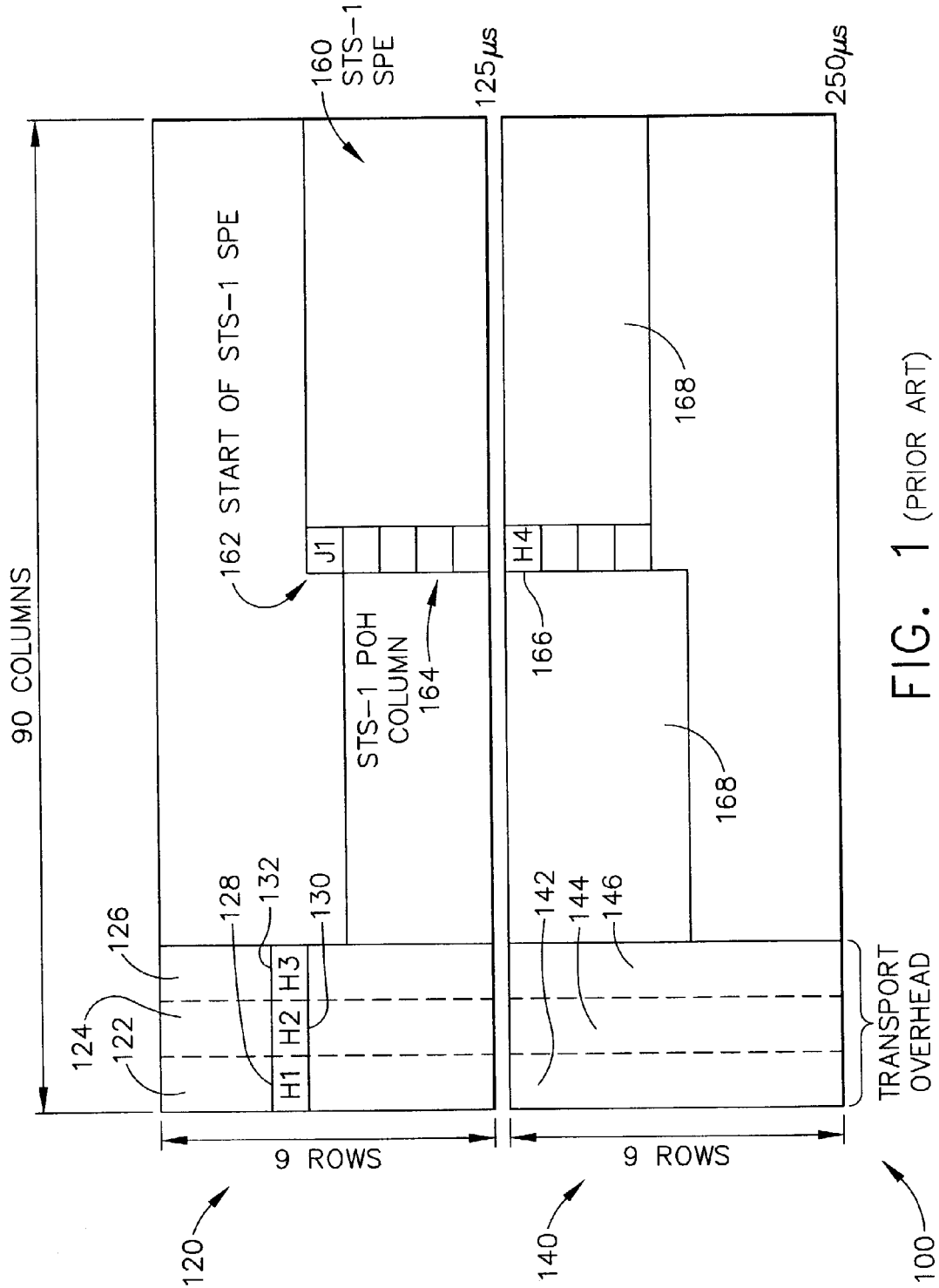
FIG. 1 illustrates a diagram of two consecutive SONET STS-1 frames useful in understanding SONET frame formats.

The usefulness of such a cross-connect switch at various levels of the digital multiplex hierarchy (DMH) is better understood by first examining frame formats at different DMH levels. FIG. 1 illustrates a diagram 100 of two consecutive STS-1 frames useful in understanding the SONET frame format, including a first STS-1 frame 120 and a second STS-1 frame 140. Each STS-1 frame includes 6480 bits (810 bytes). The 810 bytes of the frame are considered to be organized as a two-dimensional data array having 9 rows and 90 columns. Data is transmitted starting from the byte in the first row and the first column, followed by bytes in successive columns along the first row until the byte in the last (i.e., $90^{th}$) column. Subsequently the byte from the first row in the second column is transmitted. This pattern is followed until the last byte, located in the $90^{th}$ column of the $9^{th}$ row, is transmitted. Within each byte the data is transmitted most significant bit first but the byte is considered to be the native SONET data format.

The first three columns 122, 124, and 126 of frame 120 and 142, 144, and 146 of frame 140 each contain 27 transport overhead bytes. The transport overhead bytes include nine section overhead (SOH) bytes and eighteen line overhead (LOH) bytes. The next 87 columns are dedicated to payload and contain a synchronous payload envelope (SPE) 160. The payload of an SPE may have its first byte anywhere inside the payload portion and the first byte may move around in this area between frames. In the example illustrated in FIG. 1 SPE 160 begins in frame 120 at start 162 and ends in frame 140. The method by which the starting payload location is determined is responsive to the contents of transport overhead bytes in the frame referred to as "H1" and "H2" such as H1 byte 128 and H2 byte 130 in frame 120. H1 and H2 store an offset value referred to as a "pointer", indicating a location in STS-1 frame 120 in which the first payload byte is located, relative to the following byte in the transport overhead labeled "H3" such as H3 byte 132 in frame 120. Within SPE 160, two of the 87 columns of the matrix (30 and 59) contain fixed stuff bytes and thus do not contain data. A first one of the 87 columns, column 164 in frame 120, contains nine STS-1 pointer overhead (POH) bytes. Thus eighty-four columns are available for useful payload.

SONET defines another level of pointer processing to locate virtual tributaries (VTs) within the SPE. A SONET frame uses a byte of the POH known as the multiframe indicator labeled "H4" to indicate which frame of a superframe is included in the SPE, such as H4 byte 166. A VT superframe spans four STS-1 frames and if H4=XXXXXX00, the next frame is the first frame of a superframe, and the SPE includes a pointer to the VT start known as "V1". If H4=XXXXX01, the next frame is the second frame of a superframe and the SPE includes a pointer to the VT payload known as V2. V1 and V2 are concatenated to form a further pointer within the VT envelope to the first byte of the VT frame, known as the V5 byte. Thus the VT frame may move within the VT envelope as well.

The type of VT determines the number of columns of bytes contained in the particular STS-1 frame. For example VT1.5 includes 26 bytes per STS-1 frame and 104 bytes per superframe, translating into a transmission rate of 26 bytes/ 125 sec=208 bits/125 sec=1.664 Mbps.

Figure 2:
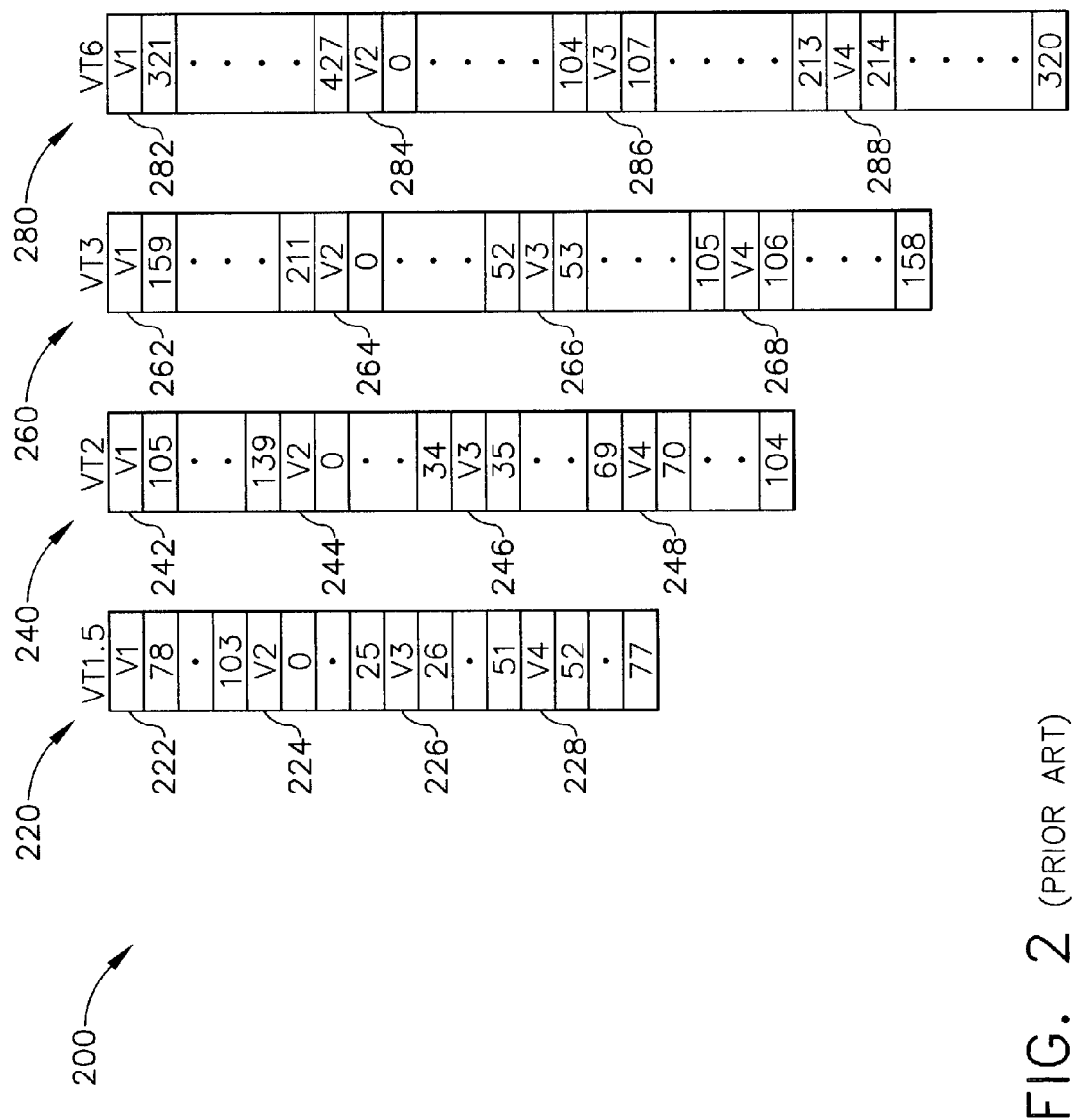
FIG. 2 illustrates a diagram of four virtual tributary frame formats.

FIG. 2 illustrates a diagram 200 of four virtual tributary superframes, each spread over four STS-1 frames. A first type of VT frame 220 has a format known as VT1.5 with a data rate of 1.544 Mbps. The first byte 222 is the V1 pointer byte. A second byte 224 separated from V1 by 26 data payload bytes is the V2 pointer byte. The concatentation of V1 and V2 form the pointer within the superframe envelope of the start of the VT 1.5 payload, measured in bytes offset from the V2 byte. In the illustrated embodiment V1:V2=0 so the first byte of the VT1.5 payload is the next byte after V2. This byte is also known as the V5 byte and is labeled "0" in FIG. 2. A third byte 226 separated from V2 by 26 bytes is an action byte known as V3. A fourth byte 228 separated from V3 by 26 bytes is a reserved byte known as V4. Each VT1.5 superframe includes 104 bytes of payload data and as shown in FIG. 2, bytes 0 through 25 are between pointer bytes 224 and 226, bytes 26 through 51 are between pointer bytes 226 and 228, bytes 52 through 77 are from pointer byte 228 to the end of the superframe, and bytes 78 through 103 are between pointer bytes V1 and V2.

A second type of VT frame 240 has a format known as VT2 with a data rate of 2.048 Mbps. The VT2 superframe contains V1, V2, V3, and V4 bytes 242, 244, 246, and 248, respectively, and 140 bytes of payload located within the payload envelope by V1:V2. In the case where V1:V2=0 shown in FIG. 2, the first byte immediately follows V2 and contains payload byte 0, etc.

A third type of VT frame 260 has a format known as VT3 with a data rate of twice that of VT1.5, or 3.088 Mbps. The VT3 superframe contains V1, V2, V3, and V4 bytes 262, 264, 266, and 268, respectively, and 212 bytes of payload located within the payload envelope by V1:V2. In the case where V1:V2=0 shown in FIG. 2, the first byte immediately follows V2 and contains payload byte 0, etc.

A fourth type of VT frame 280 has a format known as VT6 with a data rate of twice that of VT3 and four times that of VT1.5, or 6.176 Mbps. The VT6 superframe contains V1, V2, V3, and V4 bytes 282, 284, 286, and 288, respectively, and 428 bytes of payload located within the payload envelope by V1:V2. In the case where V1:V2=0 shown in FIG. 2, the first byte immediately follows V2 and contains payload byte 0, etc.

Figure 3:
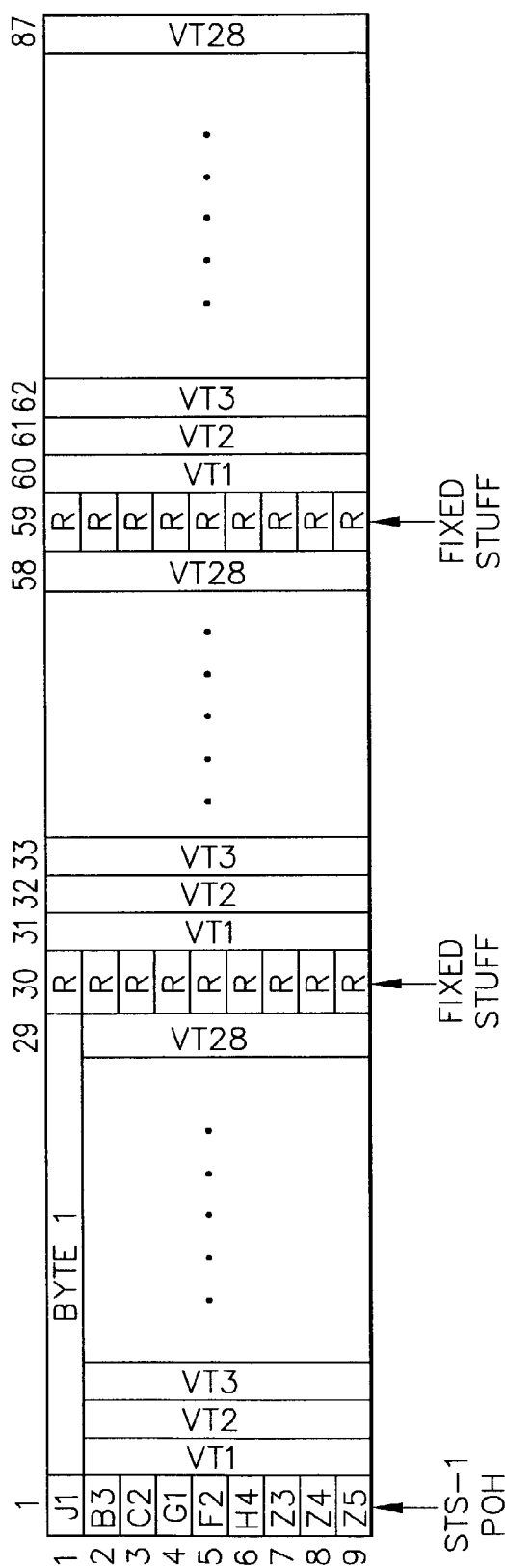
FIG. 3 illustrates a diagram of an STS-1 SPE useful in understanding SONET virtual tributaries.

FIG. 3 illustrates an example of a SONET STS-1 SPE 300 that includes 28 VT1.5s. In this case, the VTs are aligned with the start of an SPE such that a first VT labeled "VT1" has payload data in columns 31, 60, and 2, a second VT labeled "VT2" has payload data in columns 32, 61, and 3, and so on. After the J1 byte of the POH, the next 28 bytes include the pointer bytes for the VTs. If H4 indicates that this is the first SPE of the superframe, then the second byte of the STS-1 frame contains the V1 byte for VT1, the third byte of the STS-1 frame contains the V1 byte for VT2, and so on. Columns 30 and 59 contain fixed stuff bytes labeled "R" and do not form a part of the VT payload.

Figure 4:
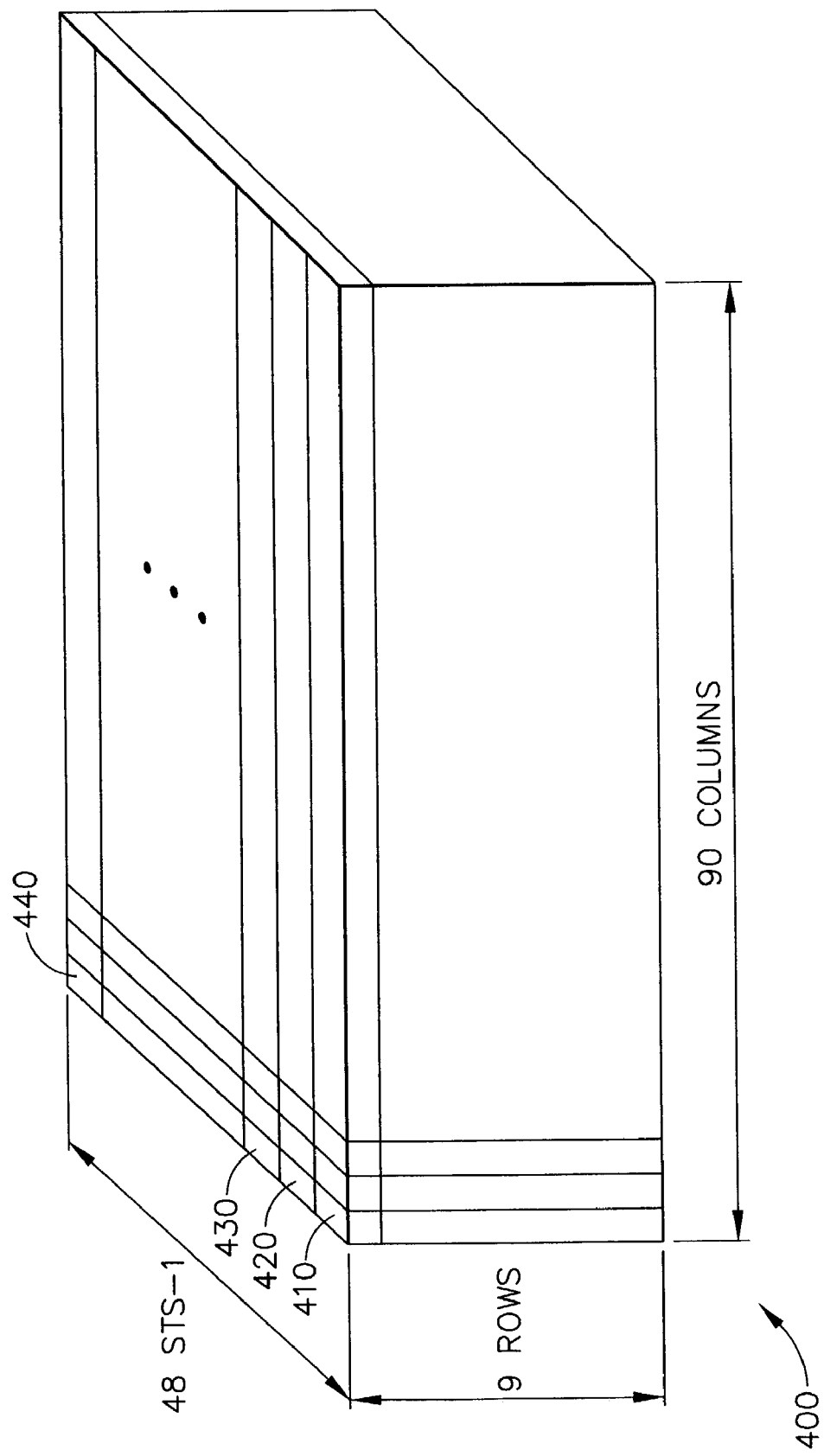
FIG. 4 illustrates a diagram of an STS-48 frame.

While an STS-1 frame format is transmitted at the OC-1 rate of 51.84 Mbps, SONET also supports OC-3, OC-12, OC-48, and OC-192 rates. The higher rate frames are transmitted by interleaving STS-1 frames within the basic 8 kHz frame rate using correspondingly faster clock rates. For example, an STS-48 frame is transmitted at the OC-48 rate of 2.5 Gbps and includes forty-eight interleaved STS-1 frames. FIG. 4 illustrates a diagram of such an STS-48 frame 400. STS-48 frame 400 is envisioned as a three dimensional array of data having 9 rows by 90 columns by 48 frames, including exemplary STS-1 frames 410, 420, 430, and 440. Transmission proceeds from the byte in the first row and first column of STS-1 frame 410, to the byte in the first row and first column of STS-1 frame 420, etc. until the byte in the first row and first column of STS-1 frame 440, followed by the byte in the first row and second column of STS-1 frame 410, and so on.

These various frame structures should be kept in mind because the novel cross-connect switch to be described below can be utilized at any switching level of the DMH hierarchy, with just a modification of the pointer processing function depending on the level. This cross-connect switch can also be utilized for the similar STM- and TU-level switching in an SDH system.

Figure 5:
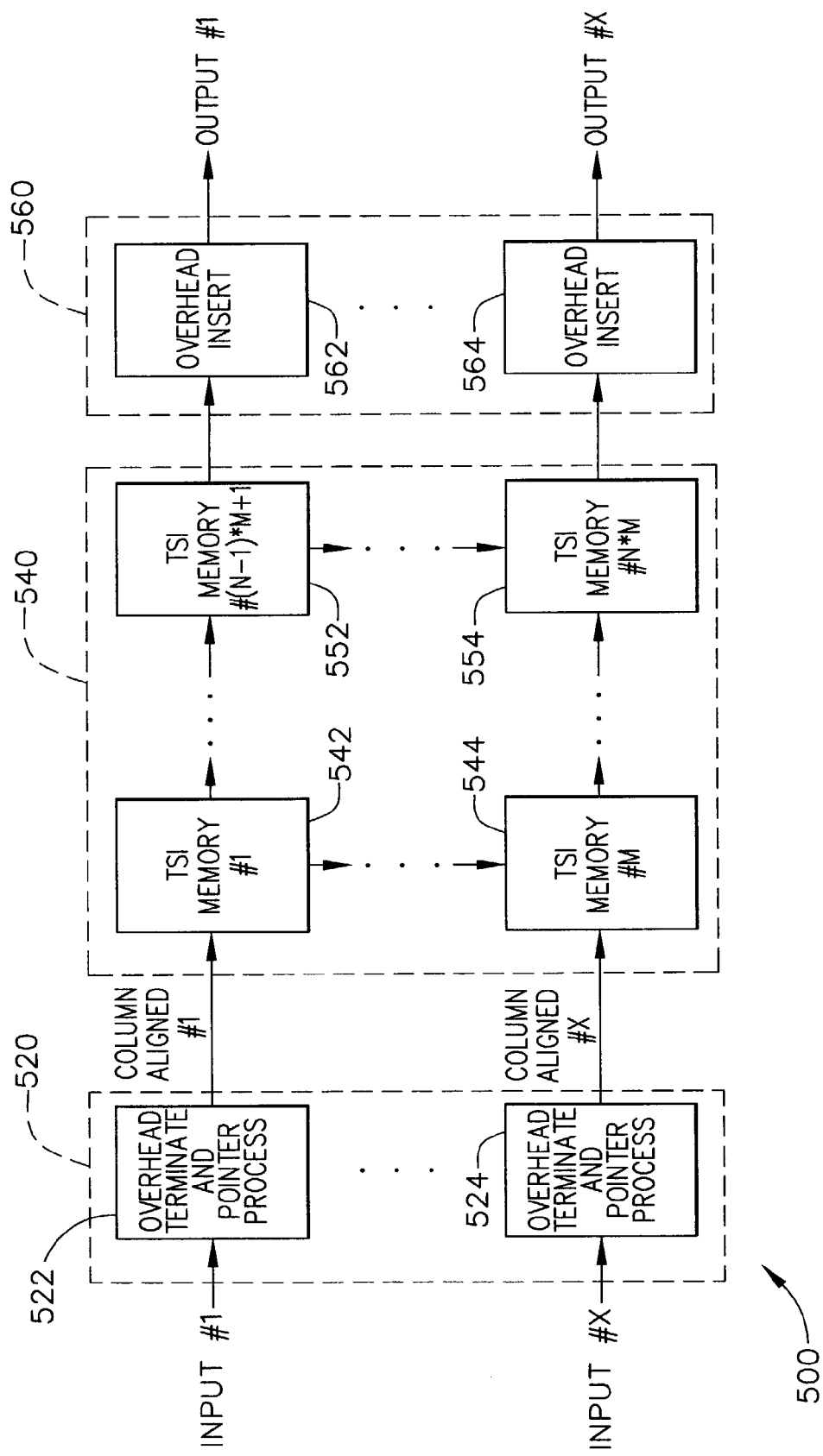
FIG. 5 illustrates a SONET cross-connect switch known in the prior art.

As mentioned above, known cross-connect switches require systolic memory arrays that grow in size exponentially as the number of inputs grow, limiting the practical size of the cross-connect switch. FIG. 5 illustrates such a SONET cross-connect switch 500 known in the prior art. Cross-connect switch 500 is illustrated in a general sense as switching X inputs to X outputs. Cross-connect switch 500 includes generally a first time portion 520, a space portion 540, and a second time portion 560 to perform conventional time-space-time switching.

Time portion 520 receives X number of inputs labeled "INPUT #1" through "INPUT #X", respectively for receiving corresponding DMH signals such as STS-1 signals. As shown in FIG. 5 an illustrative overhead terminate and pointer process block 522 has an input for receiving INPUT #1, and an output for providing a signal labeled "COLUMN ALIGNED #1". An overhead terminate and pointer process block 524 has an input for receiving INPUT #X, and an output for providing a signal labeled "COLUMN ALIGNED #X".

Space portion 540 includes an M by N matrix of time slot interchange (TSI) memory arrays arranged in M rows and N columns. Shown in FIG. 5 are exemplary memories 542 and 552 along the first row and exemplary memories 544 and 554 along the Mth row. M is a number related to the number of system inputs and the number of input ports provided by each TSI memory. N is a number related to the number of system outputs and the number of output ports provided by each TSI memory. Space portion 540 is implemented as a systolic array having memories connected in a nearest-neighbor fashion to allow the connection of any input to any output by the last column.

The TSI memories in space portion 540 are connected in a matrix to form a systolic memory array. Each cycle of the system (output) clock, a new row of column-aligned data is clocked into the leftmost memory array in each row. While data is being read into each array, it is also being driven to an adjacent memory array, either to the right of or below the given memory. By including such a large matrix of memory elements, space portion 540 has the ability to propagate any input to any output, thus providing the non-blocking feature.

Time portion 560 includes X overhead insert blocks including a first overhead insert block 562 and a second overhead insert block 564. Overhead insert block 562 has an input connected to the output of TSI memory 552, and an output for providing an output signal labeled "OUTPUT #1". Overhead insert block 564 has an input connected to the output of TSI memory 554, and an output for providing an output signal labeled "OUTPUT #X". Overhead insert blocks 562 and 564 receive the column-aligned data and assemble the data into the output frame format. In particular overhead insert blocks 560 determine the starting byte position of the SPE within the VT or STS-1 frame and create header bytes V1 and V2, or H1 and H2, indicating that location. They also create other bytes forming the remainder of the packet overhead (POH) and transport overhead (TOH) portions of the output frames.

Figure 6:
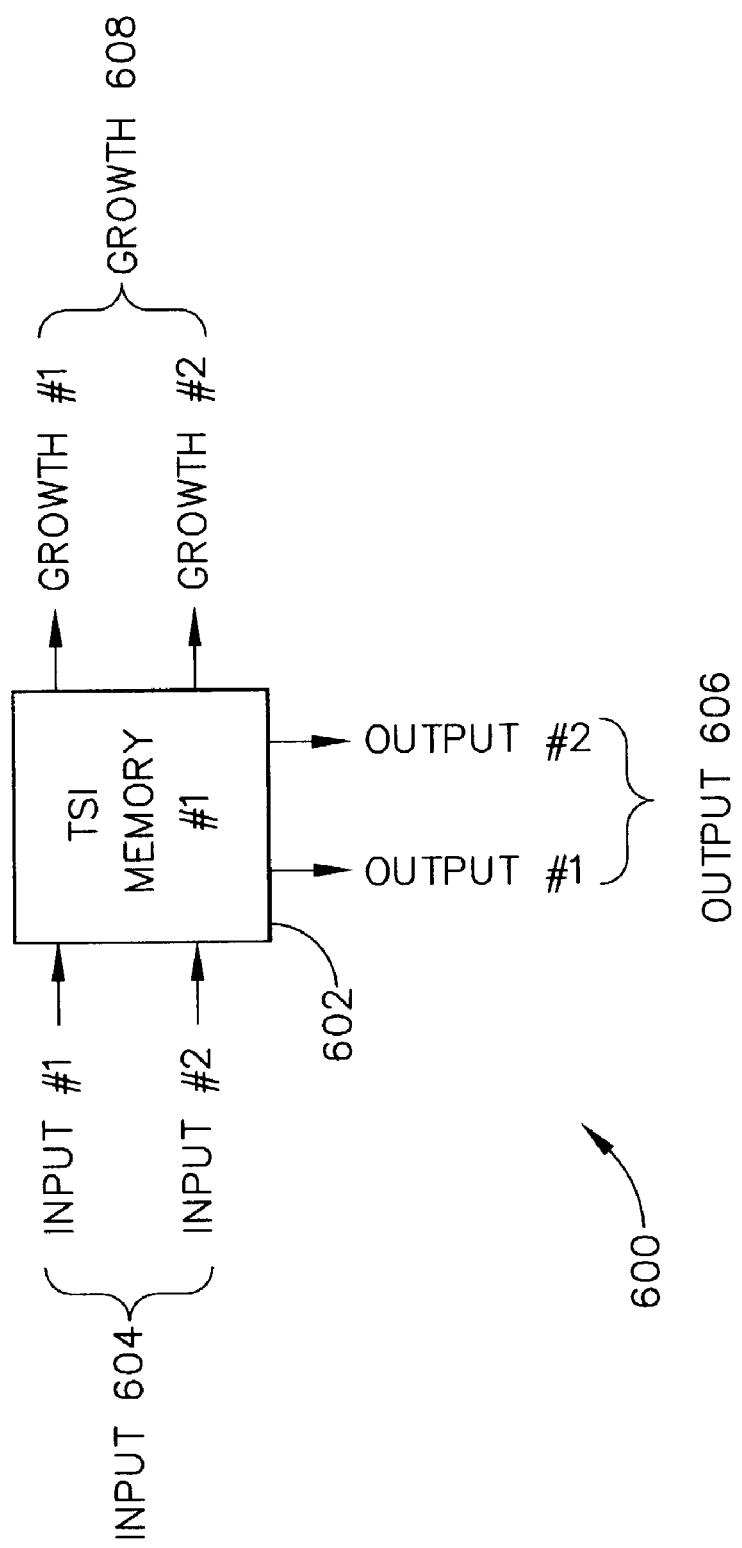
FIG. 6 illustrates the systolic memory of FIG. 5 when the number of inputs is two.

In order to understand the exponential growth of memory elements as the number of inputs and outputs grows, it is helpful to examine two smaller sized memory arrays. FIG. 6 illustrates an example 600 of systolic memory 540 of FIG. 5 when the number of inputs X is equal to two. For this rather trivial example one dual-port TSI memory 602 is all that is needed. Memory 602 has an input 604 having ports for receiving two signals STS #1 and STS #2, an output 606 having ports for providing two output signal STS #1 and STS #2, and two growth outputs 606 for providing STS #1 and STS #2 to other devices. Memory 602 is designed to handle two inputs and two outputs in a non-blocking fashion. This feature means that any VT on STS #1 can be switched to either the STS #1 or STS #2 outputs, or both. Thus this non-blocking feature supports multi-casting and broadcasting operations. A key concept is that in order for the non-blocking cross-connect operation to take place the inputs must be frame aligned.

Figure 7:
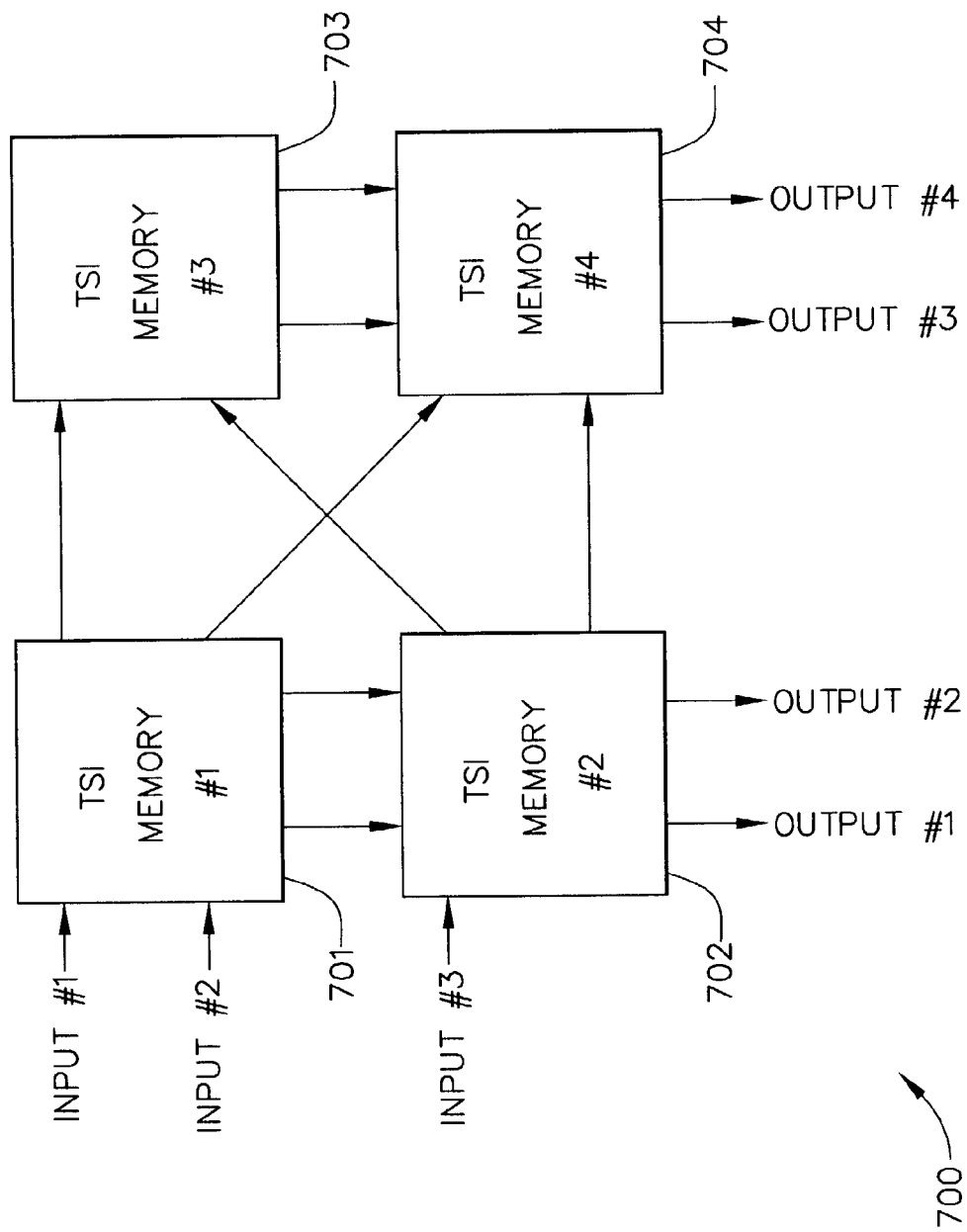
FIG. 7 illustrates the systolic memory of FIG. 5 when the number of inputs is three.

However the complexity of systolic memory 540 increases as the number of inputs grows according to a square-law characteristic. FIG. 7 illustrates an example 700 of systolic memory 540 of FIG. 5 when the number of inputs is increased to three. Since the number of inputs now exceeds the number of ports in the dual-port memories, more memory arrays need to be added to allow the cross-connect switch to be non-blocking. Thus a first TSI memory 701 has inputs for receiving INPUT #1 and INPUT #2, respectively, two primary outputs, and two growth outputs. A second TSI memory 702 has two inputs of which one is used for receiving INPUT #3, two outputs for providing OUTPUT #1 and OUTPUT #2, respectively, and two growth outputs. A third TSI memory 703 has a first input connected to the output of TSI memory 701, a second input connected to the first growth output of TSI memory 702, and first and second outputs. A fourth TSI memory 704 has a first input connected to the second growth output of TSI memory 701, a second input connected to the second growth output of TSI memory 702, third and fourth inputs connected to the outputs of TSI memory 703, a first output for providing OUTPUT #3, and a second output for providing an optional OUTPUT #4. Thus memory 700 has 3 inputs, 3 or 4 outputs, requires $(3-1)^2=4$ memories, and has a group delay of $(3-1)=2$ cycles. It should be apparent from considering FIGS. 6 and 7 that as the number of inputs increases, the number of memories grows according to a square-law characteristic.

Figure 8:
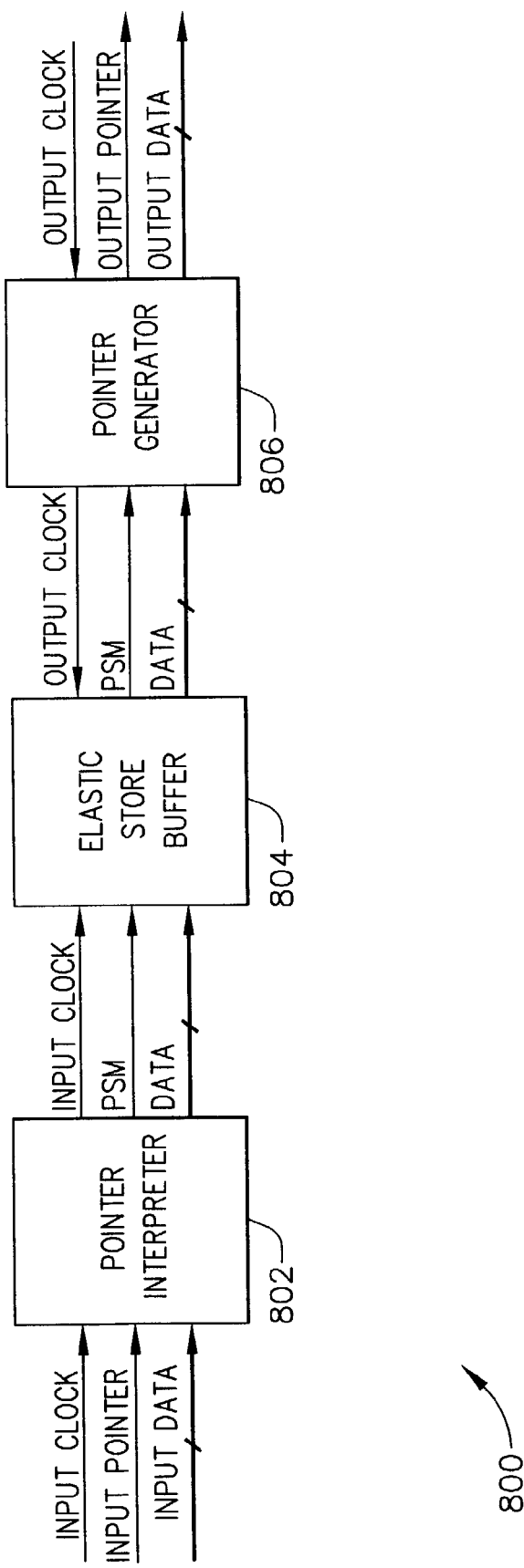
FIG. 8 illustrates in block diagram form a pointer processor useful in understanding the present invention.

To avoid the practical size limitations caused by this square-law relationship, the inventor has changed the whole switching paradigm by breaking the pointer processing function into its constituent parts and changing the time-space-time switch into a simple space switch. FIG. 8 illustrates in block diagram form a pointer processor 800 useful in understanding the present invention. Pointer processor 800 includes three functional blocks, including a pointer interpreter 802, an elastic store buffer 804, and a pointer generator 806. Pointer interpreter 802 receives an input SONET/SDH data stream labeled "INPUT DATA" in synchronism with a clock labeled "INPUT CLOCK". Since the basic data unit is a byte, the input clock is the SONET bit clock divided by eight. For example when performing the pointer interpretation function at the STS-1 level, the INPUT CLOCK is provided at a frequency of 51.44 MHz/8=6.43 MHz. The INPUT POINTER is the 8 kHz synchronization pulse to define the frame boundaries. Pointer interpreter 802 uses the INPUT POINTER to locate the H1 and H2 bytes, which it then interprets using a state machine to locate the first payload byte, the J1 byte. Pointer interpreter 802 then strips off the TOH bytes and appends a value known as the payload start marker (PSM) to indicate the location of the J1 byte. Thus, PSM is asserted during the byte time at which the J1 byte occurs. Pointer interpreter 802 provides the INPUT DATA synchronized with the INPUT CLOCK to outputs thereof. Elastic store buffer 804 has inputs for receiving the INPUT CLOCK, INPUT DATA, and PSM from pointer interpreter 802. Elastic store buffer 802 is essentially a first-in, first-out buffer that inputs data at the INPUT CLOCK rate provided by pointer interpreter 802, and outputs data at an OUTPUT CLOCK rate provided by pointer generator 806. Pointer generator 806 reads the data and uses the PSM to provide a new pointer labeled "OUTPUT POINTER" on the output side of the memory.

Pointer processing is the feature in SONET/SDH based systems that allows rate adaptation between input and output signals. When an STS input signal is to be multiplexed into a higher rate SONET/SDH output signal, it is required that the frames be frame aligned, and the clock rate matches the output clock rate. Since the autonomous inputs arrive at a system input with unknown frame locations, and potentially asynchronous clock rates, the input must be conditioned to meet the output requirements.

According to the present invention, the cross-connect point is changed by splitting the pointer processor into its constituent parts shown in FIG. 8 and performing a combinatorial multiplexing prior to buffering. Thus the cross-connect function is performed at a point in the system before the INPUT DATA has been cast into the OUTPUT CLOCK rate. Because the data alignment has not taken place by this point in the system there is no need to be concerned about maintaining frame or column alignment. Thus the need for a large TSI systolic memory array is eliminated.

Figure 9:
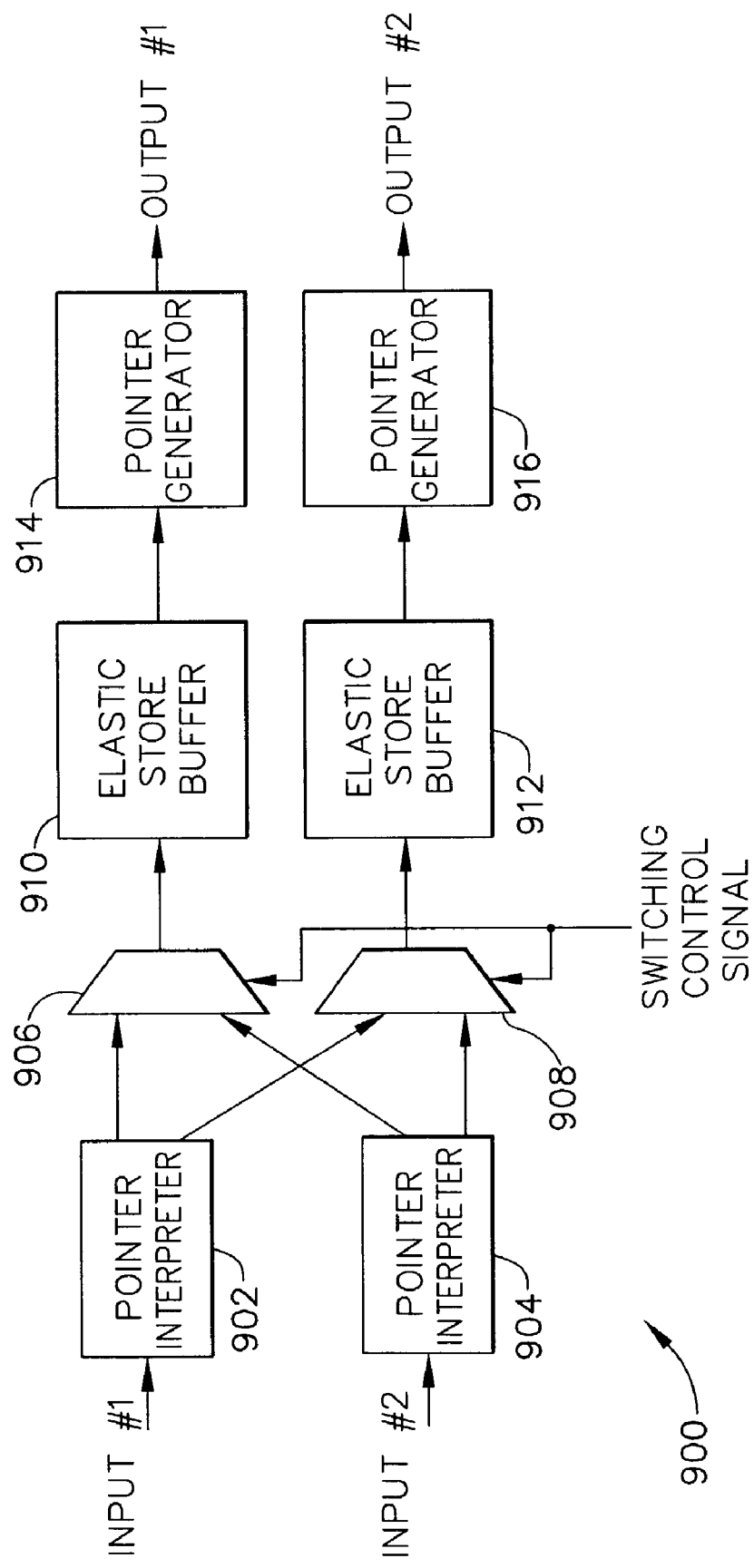
FIG. 9 illustrates in block diagram form a cross-connect switch according to the present invention with two inputs.

A new SONET/SDH cross-connect according to this technique is shown in FIG. 9, which illustrates in block diagram form a cross-connect switch 900 with two inputs according to the present invention. As in FIG. 6, cross-connect switch 900 has two inputs INPUT #1 and INPUT #2 and two outputs OUTPUT #1 and OUTPUT #2. Cross-connect switch 900 includes pointer interpreters 902 and 904, multiplexers 906 and 908, elastic store buffers 910 and 912, and pointer generators 914 and 916. Pointer interpreters 902 and 904 each have an input for receiving a respective one of inputs INPUT #1 and INPUT #2, and corresponding outputs, and interpret the pointer bytes in the overhead portion of the frame to identify, using pointer start markers, the first byte of payload within a frame.

Multiplexer 906 has a first input connected to the output of pointer interpreter 902, a second input connected to the output of pointer interpreter 904, a control input for receiving a control signal labeled "SWITCHING CONTROL SIGNAL", and an output. Multiplexer 908 has a first input connected to the output of pointer interpreter 902, a second input connected to the output of pointer interpreter 904, a control input for receiving the SWITCHING CONTROL SIGNAL, and an output. Note that SWITCHING CONTROL SIGNAL is used generically and multiplexers 906 and 908 actually receive two different signals (although the different signals may select the same input for broadcast or multi-cast operation).

Elastic store buffer 910 has an input connected to the output of multiplexer 906, and an output. Elastic store buffer 912 has an input connected to the output of multiplexer 908, and an output. Elastic store buffers 910 and 912 input those bytes at the output of multiplexers 906 and 908, respectively, that represent valid payload data for the selected input channel, using an input clock rate. Elastic store buffers 910 and 912 output the stored, valid bytes and a payload start marker using the output clock rate.

Pointer generator 914 has an input connected to the output of elastic store buffer 910, and an output connected to OUTPUT #1. Pointer generator 916 has an input connected to the output of elastic store buffer 912, and an output connected to OUTPUT #2. Pointer generators 914 and 916 determine the offset from within the output frame and generate output pointers which can then be used by output framers to construct any type of frame on the output side.

Figure 10:
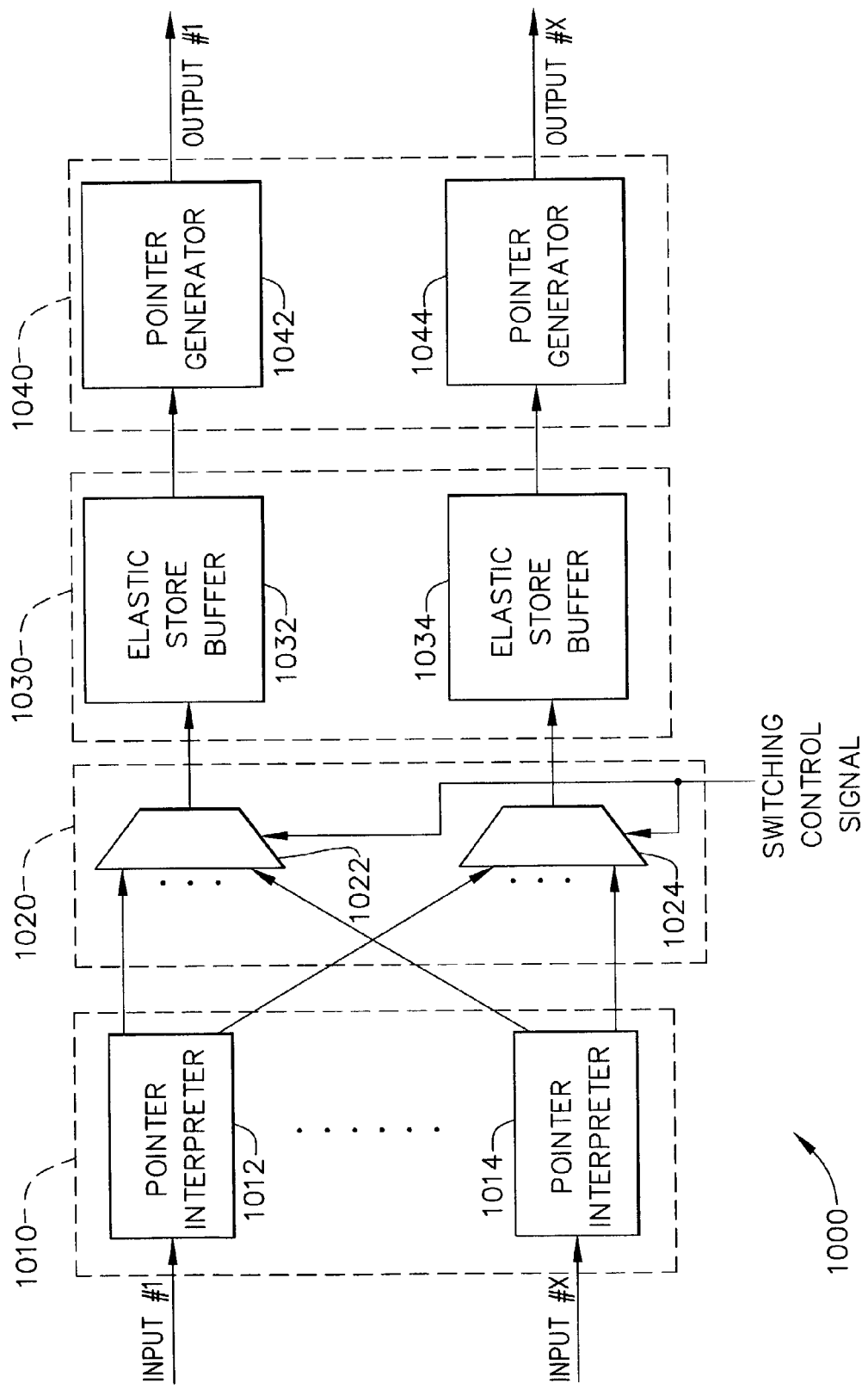
FIG. 10 illustrates in block diagram form a cross-connect switch according to the present invention with an arbitrary number of inputs.

The cross-connect switch of FIG. 9 can be expanded as shown in FIG. 10, which illustrates in block diagram form a cross-connect switch 1000 with an arbitrary number of inputs X and outputs X according to the present invention. Cross-connect switch 1000 includes generally a pointer interpreter portion 1010, a multiplexer portion 1020, an elastic store buffer portion 1030, and a pointer generator portion 1040. Pointer interpreter portion 1010 includes a pointer interpreter for each input, including a pointer interpreter 1012 associated with INPUT #1 and a pointer interpreter 1014 associated with INPUT #X.

Multiplexer portion 1020 includes one multiplexer for each output, including representative multiplexers 1022 and 1024. Each multiplexer has X inputs connected to the outputs of respective pointer interpreters, a control input for receiving the SWITCHING CONTROL SIGNAL, and an output. As noted above with respect to FIG. 9 the SWITCHING CONTROL SIGNAL actually includes unique signals for each multiplexer, but these signals may select the same inputs of several or all multiplexers to support broadcast or multi-cast operation and to make cross-connect switch 1000 non-blocking. Thus multiplexer portion 1020 forms a memory-less space switch.

Elastic store buffer portion 1030 includes one elastic store buffer for each output, including representative elastic store buffers 1032 and 1034. Elastic store buffer 1032 has an input connected to the output of multiplexer 1022, and an output. Elastic store buffer 1034 has an input connected to the output of multiplexer 1024, and an output. The elastic store buffers operate as in FIG. 9 to input valid data and the pointer start marker at the input clock rate, and output valid data and the pointer start marker at the output clock rate.

Pointer generator portion 1040 includes one pointer generator for each output, including representative pointer generators 1042 and 1044. Pointer generator 1042 has an input connected to the output of elastic store buffer 1032, and an output connected to OUTPUT #1 of switch 1000. Pointer generator 1044 has an input connected to the output of elastic store buffer 1034, and an output connected to OUTPUT #X of switch 1000.

An important advantage of the present invention is that the number of components grows linearly instead of exponentially. There is one pointer interpreter for each input, so the number of pointer interpreters grows linearly with the number of inputs. There is also one multiplexer per output, and the number of inputs of each multiplexer grows linearly with the number of inputs. The number of elastic store buffers and pointer generators is equal to the numbers of outputs. Thus the exponential growth of the large memory components as the number of inputs and outputs increases is eliminated.

Figure 11:
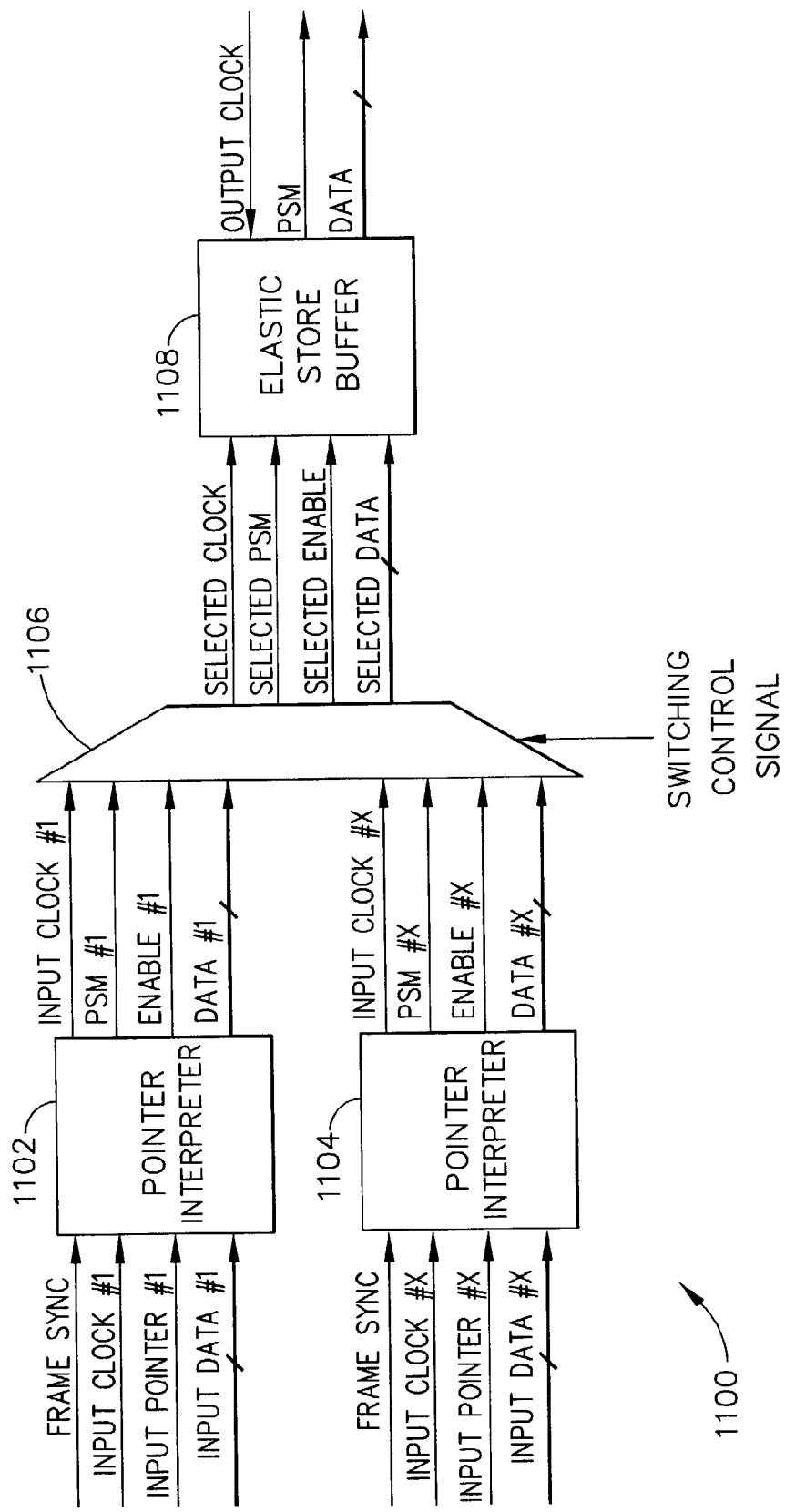
FIG. 11 illustrates in block diagram form a portion of the cross-connect switch of FIG. 10 in greater detail.

FIG. 11 illustrates in block diagram form a portion 1100 of the cross-connect switch of FIG. 10 in greater detail. Portion 1100 includes representative pointer interpreters 1102 and 1104, a multiplexer 1106, and an elastic store buffer 1108. Pointer interpreter 1102 has inputs for receiving a frame synchronization signal labeled "FRAME SYNC", a clock signal labeled "INPUT CLOCK #1", a pointer labeled "INPUT POINTER #1", an input data signal labeled "INPUT DATA #1", and has outputs for providing INPUT CLOCK #1, a pointer start marker labeled "PSM #1", an enable signal labeled "ENABLE #1", and a corresponding data signal labeled "DATA #1". Pointer interpreter 1104 has inputs for receiving a frame synchronization signal labeled "FRAME SYNC", a clock signal labeled "INPUT CLOCK #X", a pointer labeled "INPUT POINTER #X", data labeled "INPUT DATA #X", and has outputs for providing INPUT CLOCK #X, a pointer start marker labeled "PSM #X", an enable signal labeled "ENABLE #X", and a corresponding data signal labeled "DATA #X". Pointer interpreters 1102 and 1104 determine the first payload bytes by using the corresponding INPUT POINTER and calculate the byte offset as appropriate from the start of the frame using the FRAME SYNC signal. Note that when cross-connect switch 1000 switches STS-level data, the FRAME SYNC pulse is the 8 kHz STS synchronization pulse. When cross-connect switch 1000 switches VT-level data, the FRAME SYNC pulse is a 2 kHz multiframe synchronization pulse since the VT superframe spans four STS frames. In order to avoid the need to output column-aligned data, pointer interpreters 1102 and 1104 provide the pointer start marker and an enable signal to indicate when the data represents valid data. These signals may be used to switch data at either the STS level or the VT level as more fully illustrated in FIGS. 12 and 13.

Figure 12:
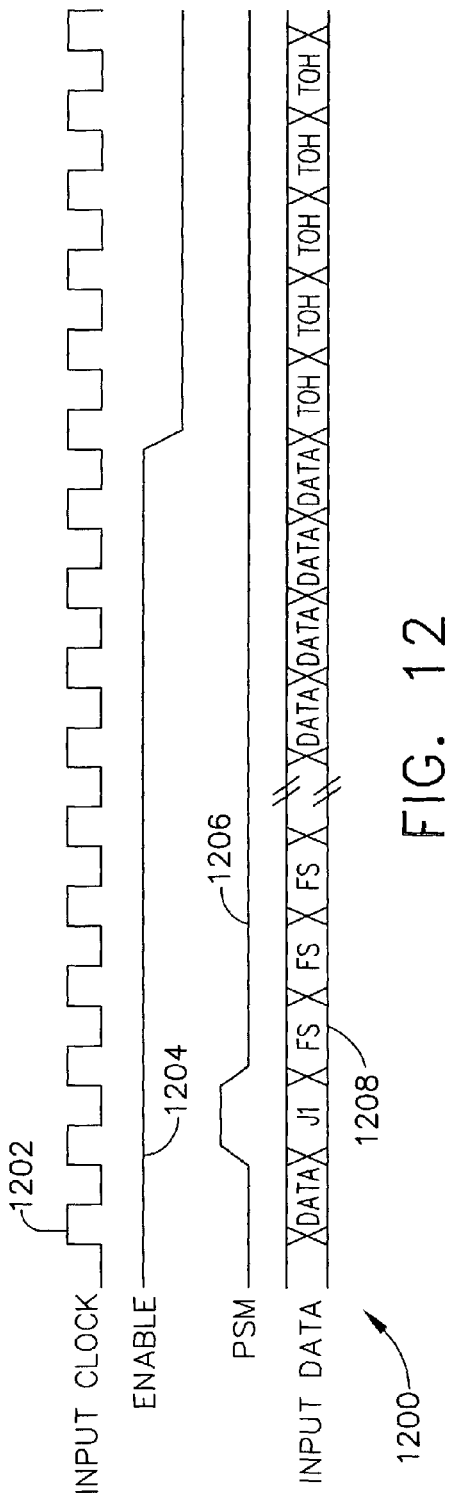
FIG. 12 illustrates a timing diagram of various signals generated by the pointer interpreter of FIG. 11 when the cross-connect switch of FIG. 10 is used at the STS-1 level.

FIG. 12 illustrates a timing diagram 1200 of various signals generated by the pointer interpreter of FIG. 11 when cross-connect switch 1000 of FIG. 10 is used at the STS level. At the STS level, the corresponding pointer interpreter uses the H1 and H2 bytes to locate the first byte of the payload, the J1 byte. Data is received in byte units in synchronism with the INPUT CLOCK as illustrated by waveform 1202. The ENABLE signal as shown by waveform 1204 is active at a logic high level to indicate those cycles during which the INPUT DATA, as illustrated by waveform 1208, represents payload. The ENABLE signal is inactive at a logic low level to indicate those cycles during which the INPUT DATA represents overhead. In the case of STS-level switching, this overhead is in the form of the transport overhead (TOH) bytes. The pointer start marker (PSM) illustrated by waveform 1206 is active at a logic high during the cycle of INPUT CLOCK in which the first payload byte, the J1 byte, is being transmitted, and is inactive at a logic low at all other times.

Figure 13:
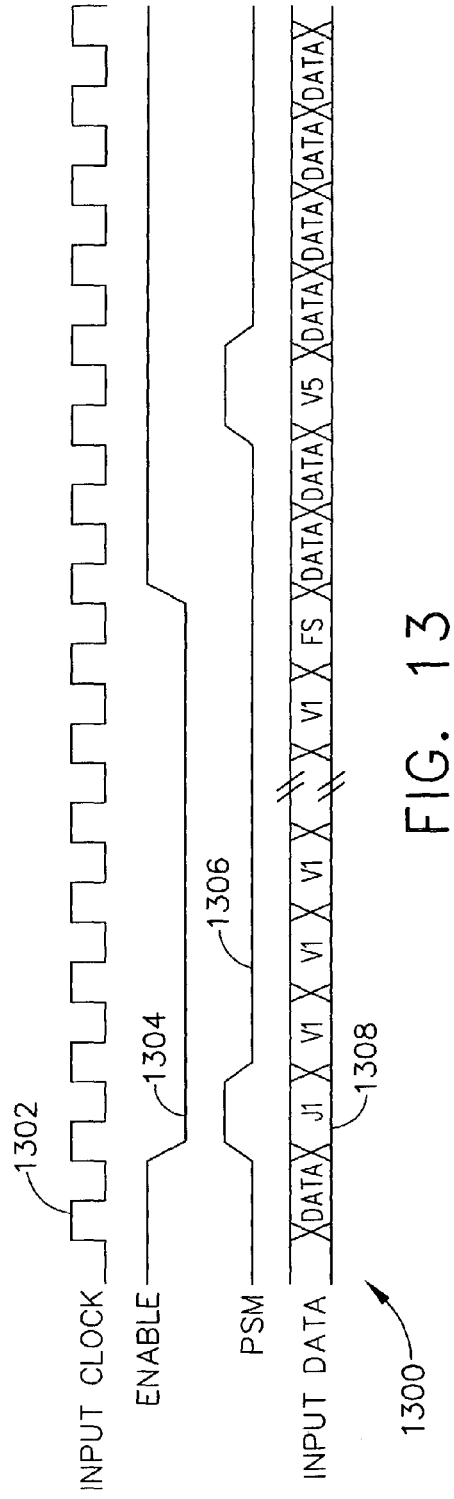
FIG. 13 illustrates a timing diagram of various signals generated by the pointer interpreter of FIG. 10 when the cross-connect switch of FIG. 11 is used at the VT level.

FIG. 13 illustrates a timing diagram 1300 of various signals generated by the pointer interpreter of FIG. 11 when cross-connect switch 1000 of FIG. 10 is used at the VT level. At the VT level, the corresponding pointer interpreter not only uses the H1 and H2 bytes to locate the J1 byte, but also uses the V1 and V2 bytes to locate the first byte of the payload, the V5 byte. Data is received in byte units in synchronism with the INPUT CLOCK illustrated by waveform 1302. The ENABLE signal as shown by waveform 1304 is active at a logic high level to indicate those cycles during which the INPUT DATA, as illustrated by waveform 1308, represents payload. The ENABLE signal is inactive at a logic low level to indicate those cycles during which the INPUT DATA represents overhead. Note that for VT level switching, overhead includes the TOH bytes as in STS-level switching but also the first twenty-nine bytes of the STS payload, containing the J1 byte and twenty-eight VT pointer bytes. The PSM illustrated by waveform 1306 is active at a logic high level during the cycle of INPUT CLOCK in which the first STS payload byte, the J1 byte, is being transmitted as well as when the first VT payload byte, the V5 byte, is being transmitted and is inactive at a logic low at all other times. Thus the J1 byte is indicated by ENABLE being inactive at a logic low and PSM being active at a logic high level, whereas the V5 byte is indicated by ENABLE being active at a logic high and PSM being active at a logic high.

Returning now to FIG. 11, multiplexer 1106 has inputs for receiving the INPUT CLOCK, PSM, ENABLE, and DATA signals from each of the X inputs, and a single output for providing one of the INPUT CLOCK signals labeled "SELECTED CLOCK", a corresponding PSM labeled "SELECTED PSM", and corresponding data labeled "SELECTED DATA". Multiplexer 1106 selects one of the inputs in response to the SWITCHING CONTROL SIGNAL. Note that after the multiplexing function is complete, the ENABLE signal is discarded, but the multiplexer only stores valid data in elastic store buffer 1108. However the PSM is also stored in elastic store buffer 1108 since it is needed to generate the pointer on the output side. Thus on the output side elastic store buffer 1108 has an input for receiving the OUTPUT CLOCK, and outputs for providing the DATA corresponding to the SELECTED DATA and the PSM corresponding to the DATA being provided.

While the invention has been described in the context of a preferred embodiment, various modifications will be apparent to those skilled in the art. For example a cross-connect switch according to the present invention is useful at either the STS/STM level or the VT/TU level of a SONET/SDH system. Furthermore while this invention is applicable to SONET and SDH, it is further applicable to other synchronous networks having similar hierarchical signaling characteristics. The logic levels corresponding to active and inactive logic states for the signals described herein may vary in different embodiments. Accordingly, it is intended by the appended claims to cover all modifications of the invention that fall within the true scope of the invention.

I claim:

1. A cross-connect switch for a synchronous network comprising:
    a pointer interpreter portion having inputs coupled to each of a plurality of input channels at a predetermined level of a digital multiplex hierarchy for receiving, for each input channel, an input data signal and an input pointer, and having outputs for providing, for each input channel, a payload start marker that is active when said input data signal represents a start of a payload portion of a frame;
    a memory-less space switch coupled to said pointer interpreter portion, having inputs for receiving said input data signal and said payload start marker of each input channel, and outputs for providing, for each of a plurality of output channels at said predetermined level of said digital multiplex hierarchy, a selected input data signal and a corresponding selected payload start marker from any one of said plurality of input channels in response to a switching control signal;
    an elastic buffer portion coupled to said memory-less space switch having inputs for storing data from corresponding outputs of said memory-less space switch at an input clock rate, and outputs for providing an output data signal and a corresponding payload start marker at an output clock rate for each of said plurality of output channels; and
    a pointer generator portion coupled to said elastic buffer portion for receiving, for each output channel, said output data signal and said corresponding payload start maker and for providing, for each output channel, said output data signal and a corresponding output pointer indicating an alignment of said output data signal in an output frame.

2. The cross-connect switch of claim 1 wherein said memory-less space switch comprises a plurality of multiplexers each corresponding to one of said plurality of output channels, each multiplexer having inputs corresponding to each output of said pointer interpreter portion, and outputs, each multiplexer selecting one of said inputs in response to a switching control signal.

3. The cross-connect switch of claim 1 wherein said pointer interpreter portion comprises a plurality of pointer interpreters each having an input for receiving a corresponding input clock signal, a corresponding input pointer, and a corresponding input data signal, and an output for providing a corresponding payload start marker.

4. The cross-connect switch of claim 3 wherein each of said plurality of pointer interpreters further provides, for each input channel, an enable signal that is active to indicate when said data signal represents payload data and is inactive to indicate when said input data signal represents overhead, and wherein said elastic buffer portion stores data for each output channel only when a corresponding enable signal selected by said memory-less space switch is valid.

5. The cross-connect switch of claim 1 wherein said elastic store buffer portion comprises a plurality of elastic store buffers, each having an input coupled to corresponding outputs of said memory-less space switch for storing a selected input data signal in response to said input clock signal, and an output for reading data stored therein at said output clock rate.

6. The cross-connect switch of claim 1 wherein said pointer generator portion comprises a plurality of pointer generators each having an input coupled to said elastic store buffer portion for receiving an output data signal and said corresponding payload start maker, and an output coupled to a corresponding one of said plurality of output channels for providing said output data signal and said corresponding output pointer at said output clock rate for one of said plurality of output channels.

7. The cross-connect switch of claim 1 wherein the synchronous network comprises a SONET network.

8. The cross-connect switch of claim 7 wherein said pointer within said frame comprises H1 and H2 bytes, and said memory-less space switch switches synchronous transport signal (STS) payloads.

9. The cross-connect switch of claim 7 wherein said pointer within said frame comprises V1 and V2 bytes, and said memory-less space switch switches virtual tributary (VT) payloads.

10. The cross-connect switch of claim 1 wherein the synchronous network comprises an SDH network.

11. The cross-connect switch of claim 10 wherein said pointer within said frame comprises H1 and H2 bytes, and said memory-less space switch switches synchronous transport module (STM) payloads.

12. The cross-connect switch of claim 10 wherein said pointer within said frame comprises V1 and V2 bytes, and said memory-less space switch switches tributary unit (TU) payloads.

13. In a cross-connect switch of a synchronous network for a plurality of input channels at a predetermined level of a digital multiplex hierarchy and a plurality of output channels at the predetermined level of the digital multiplex hierarchy, each input channel having a pointer processor including a pointer interpreter coupled to a corresponding input channel, each output channel having an elastic store buffer, and a pointer generator, wherein the cross-connect switch further comprises:
    a memory-less space switch interposed between a plurality of pointer interpreters and a plurality of elastic store buffers, the space switch switching selected outputs of said plurality of pointer interpreters to inputs of each elastic store buffer in response to a switching control signal,
    wherein each of said plurality of pointer interpreters has an input for receiving a corresponding input clock signal, a corresponding input pointer, and a corresponding input data signal, and an output for providing a corresponding payload start marker, and
    wherein each of said plurality of pointer interpreters further provides, for each input channel, an enable signal that is active to indicate when said data signal represents payload data and is inactive to indicate when said input data signal represents overhead, and wherein said elastic buffer portion stores data for each output channel only when a corresponding enable signal selected by said memory-less space switch is valid.

14. The cross-connect switch of claim 13 wherein the memory-less space switch comprises a plurality of multiplexers, each multiplexer having data inputs coupled to data outputs of each of said plurality of pointer interpreters, control inputs for receiving a switching control signal, and an output coupled to a corresponding one of a plurality of elastic store buffers.

15. The cross-connect switch of claim 13 wherein each of said plurality of elastic store buffers has an input coupled to corresponding outputs of said memory-less space switch for storing a selected input data signal in response to an input clock signal, and an output for reading data stored therein at an output clock rate.

16. The cross-connect switch of claim 13 further comprising a plurality of pointer generators each having an input coupled to a corresponding one of said plurality of elastic store buffers for receiving an output data signal and a corresponding payload start maker, and an output coupled to a corresponding one of a plurality of output channels for providing said output data signal and said corresponding output pointer at said output clock rate for one of said plurality of output channels.

17. A method for performing cross-connect switching in a synchronous network between a plurality of input channels at a predetermined level of a digital multiplex hierarchy and a plurality of output channels at the predetermined level of the digital multiplex hierarchy, comprising the steps of:

receiving at an input of a cross-connect switch, for each of the plurality of input channels, an input data signal, an input clock signal, and an input pointer indicating a start of a payload portion of a frame;

interpreting said pointer of each of the plurality of input channels to provide a pointer start marker that is active when said input data signal represents said start of said payload portion of said frame;

space switching said input data signal of each of the plurality of input channels to the plurality of output channels, wherein each of the plurality of output channels transmits a selected data signal, a selected pointer start marker, and a selected clock signal of one of the plurality of input channels selected in response to a switching control signal;

translating said selected data signal from an input clock domain based on said input clock signal to an output clock domain based on an output clock signal; and generating at an output of said cross-connect switch a pointer representing a location of said translated data signal in an output frame using said selected pointer start marker.

18. The method of claim 17 further comprising the step of:

interpreting said pointer of each of said plurality of input channels to provide an enable signal that is active when said input data signal represents payload data and is inactive when said input data signal represents overhead.

* * * * *